United States Patent [19]

Itakura

[11] Patent Number: 4,754,292

[45] Date of Patent: Jun. 28, 1988

[54] METHOD OF AND APPARATUS FOR FEEDING IMAGE RECORDING CARRIER

[75] Inventor: Toru Itakura, Kanagawa, Japan

[73] Assignee: Fuji Photo Film Co., Ltd., Kanagawa, Japan

[21] Appl. No.: 127,016

[22] Filed: Nov. 27, 1987

[30] Foreign Application Priority Data

Nov. 29, 1986 [JP] Japan .................................. 61-284473

[51] Int. Cl.⁴ .................................................. G01D 15/00
[52] U.S. Cl. .................................. 346/150; 355/14 SH
[58] Field of Search ................... 346/150, 153.1, 134, 346/136; 355/14 SH; 400/625–629

[56] References Cited

U.S. PATENT DOCUMENTS 4,512,652  4/1985  Buck et al. ................... 355/14 CH
4,533,230  8/1985  Fletcher et al. ............. 355/14 CH Primary Examiner—Arthur G. Evans
Attorney, Agent, or Firm—Sughrue, Mion, Zinn, Macpeak & Seas

[57] ABSTRACT

An image recording carrier such a film which falls by gravity from a film magazine is gripped by a roller pair, which is rotated in a direction opposite to the direction in which the image recording carrier is fed toward a scanning unit. The image recording carrier is thus released from the roller pair, and then the image recording carrier is pressed by a presser and positioned in a direction normal to the carrier delivering direction by a positioning member located above the roller pair. Thereafter, the image recording carrier is delivered to the scanning unit. The image recording carrier can always be positioned to establish a stable position to start recording an image on or reading an image from the image recording carrier.

9 Claims, 3 Drawing Sheets

METHOD OF AND APPARATUS FOR FEEDING IMAGE RECORDING CARRIER

BACKGROUND OF THE INVENTION

The present invention relates to a method of and an apparatus for feeding an image recording carrier, and more particularly to a method of and an apparatus for feeding an image recording carrier such as a film by delivering image recording carriers one by one from a stored stack thereof and allowing them to fall by gravity for image recording, the image recording carriers being positioned in a given position at all times to permit images to start being recorded thereon always from a desired position.

There has recently been developed and widely used, particularly in the medical field, a radiation image recording and reproducing system for producing the radiation-transmitted image of an object using a stimulable phosphor material capable of emitting light upon exposure to stimulating rays. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image information stored in the stimulable phosphor sheet may be permanently recorded on a recording carrier by an image recorder such as an image output laser printer, for example. In the image output laser printer, photographic films stored as a recording material in a magazine are loaded, and taken out one by one by a sheet delivery device such as a suction disk or cup. Thereafter, the film is fed by a feed mechanism such as belts or the like into an image information scanning recording unit. In the image information scanning recording unit, the film is mechanically fed in one direction for auxiliary scanning, while at the same time the film is scanned by a laser beam in a main scanning direction normal to the auxiliary scanning direction, for recording the desired image on the film with an image signal produced from an image reader. After the image has been recorded on the film, the film is then fed into an automatic image developing unit, for example.

In the image reader, a stack of stimulable phosphor sheets is stored in a cassette or a magazine. The stimulable phosphor sheets are taken one by one from the cassette or magazine by a sheet delivery device and a sheet feed mechanism and fed into an image information scanning reading unit, which in turn generates desired image information.

The image recording carrier in the image recorder or the image reader may not necessarily be fed or positioned stably for image recording or reading when it is supplied to an image information scanning recording or reading unit. More specifically, while the image recording carrier is being fed through the feed mechanism or system, it may be shifted or positionally displaced in its transverse direction. It would be highly difficult to accurately and desirably record an image on or read an image from the image recording carrier thus positionally displaced. Where the image recording carrier as it is fed along by the feed system is allowed to fall by gravity and then be gripped by a pair of rollers for image scanning, the leading edge of the image recording carrier may deeply be gripped between the rollers. As a result, the position to start recording or reading an image on the image recording carrier may vary from time to time, and the image may not be stably scanned.

Therefore, it is required to properly position the image recording carrier and fed the same into the image scanning recording or reading unit when the image recording carrier is allowed to fall by gravity for delivery. Various arrangements have been proposed to position the image recording carrier. One example of the proposed schemes is disclosed in Japanese Laid-Open Patent Publication No. 52-79682, for example. In the disclosed scheme, when an image recording carrier as it is fed downwardly is gripped in an inclined condition by feed members such as rollers, the feed members are reversed to position the image recording carrier in a prescribed condition, and thereafter the image recording carrier is gripped and fed by the feed members.

According to the above proposed arrangement, the image recording carrier can be corrected for its positional displacement or deviation under the inclined condition, but cannot be corrected for a transverse positional deviation. Thus, the image recording carrier cannot accurately be positioned in the transverse direction. The aforesaid conventional proposal therefore fails to avoid inaccurate recording of a desired image on the image recording carrier due to a positioning error.

SUMMARY OF THE INVENTION

It is a general object of the present invention to provide a method of and an apparatus for feeding a sheet-like or film-like image recording carrier, wherein while the image recording carrier that falls by gravity is gripped by a roller pair and delivered to a scanning unit, the roller pair is rotated in a direction opposite to the carrier delivering direction to release the image recording carrier from the roller pair, then the image recording carrier is pressed by a pressure and positioned in a direction normal to the carrier delivering direction by positioning means located above the roller pair, and thereafter the image recording carrier is delivered to the scanning unit, so that a position can always be established stably to start recording an image on or reading an image from the image recording carrier.

A major object of the present invention is to provide a method of feeding an image recording carrier to a scanning unit for recording an image on or reading an image from the image recording carrier, said method comprising the steps of: delivering the image recording carrier via first feed means to second feed means disposed therebelow and comprising a roller pair; moving said image recording carrier which has been fed to and gripped by said second feed means back toward said first feed means by actuating said second feed means in one direction; positioning said image recording carrier moved back toward said first feed means; and actuating said second feed means in the opposite direction to deliver said image recording carrier toward the scanning unit.

Another object of the present invention is to provide an apparatus for feeding an image recording carrier to a scanning unit for recording an image on or reading an image from the image recording carrier, said apparatus comprising: a guide member for guiding said image recording carrier as it falls by gravity from an image recording carrier storage unit toward the scanning unit; pressing means disposed on one side of said guide member for pressing said image recording carrier transversely; positioning means disposed on an opposite side of said guide member for receiving and positioning said image recording carrier which is pressed by said pressing means; and a reversibly rotatable roller pair disposed at a terminal end of said guide member.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
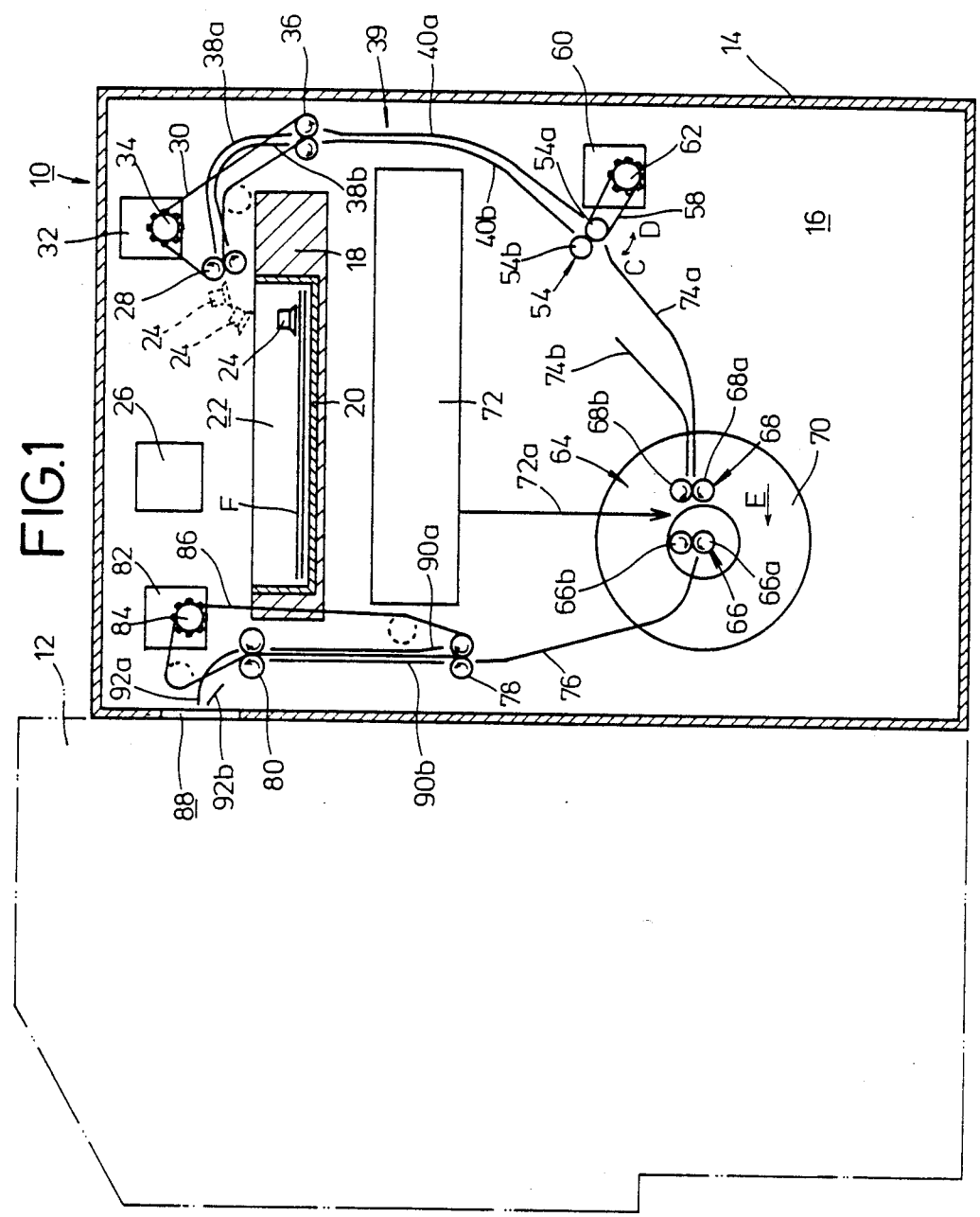
FIG. 1 is a schematic vertical cross-sectional view of an image recorder for carrying out a method of feeding image recording carriers according to the present invention.

As shown in FIG. 1, an image recorder 10 for carrying out a feeding method according to the present invention is disposed adjacent to an automatic image developing unit 12.

The image recorder 10 includes a casing 14 defining a chamber 16 therein which houses a magazine support base 18 in an upper portion thereof, the magazine support base 18 being withdrawable from and insertable into the image recorder 10. A film magazine 20 with a stack of films F stored therein is loaded in the magazine support base 18. Above the magazine support base 18, there is disposed a film delivery mechanism including a suction cup 24 movable into and out of a film access opening 22 of the film magazine 20. The suction cup 24 can be operated by a drive source 26 so as to be displaced toward a first film feed roller pair 28 as indicated by the broken lines. One of the rollers of the roller pair 28 is coaxially coupled to a sprocket around which a chain 30 is trained. The chain 30 is also trained around a sprocket 34 coupled coaxially to the drive shaft (not shown) of a rotative drive source 32, and also around a sprocket (not shown) coaxially connected to one roller of a second roller pair 36. A pair of curved guide members 38a, 38b is disposed between the first roller pair 28 and the second roller pair 36.

Figure 2:
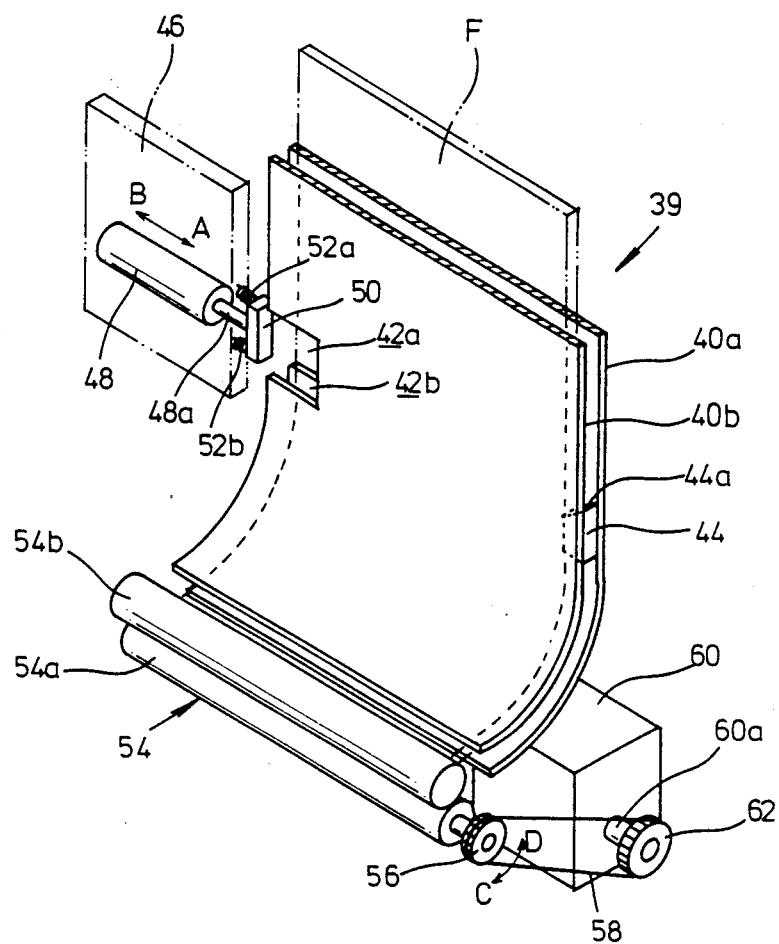
FIG. 2 is a fragmentary perspective view of a feed device in the image recorder shown in FIG. 1.

The second roller pair 36 is positioned above a feed device 39 according to the present invention, the feed device 39 including a pair of curved guide members 40a, 40b spaced from each other. As shown in FIG. 2, the guide members 40a, 40b have respective rectangular recesses 42a, 42b defined in sides thereof near their lower ends. A positioning member 44 is fixed between the other sides of the guide members 40a, 40b for guiding and positioning a film F transversely which is fed through the gap between the guide members 40a, 40b. The positioning member 44 preferably has a slanted upper surface 44a which is inclined downwardly in an inward direction.

A linear solenoid 48 is mounted on an attachment plate 46 (shown by the two-dot-and-dash lines in FIG. 2) in the vicinity of the recesses 42a, 42b. The solenoid 48 has a rod 48a extending toward the recesses 42a, 42b. When the solenoid 48 is energized, the rod 48a is displaced in the direction of the arrow A to project into the recesses 42a, 42b. A plate-like presser 50 is attached to the distal end of the rod 48a and engaged by ends of tension springs 52a, 52b at opposite ends of the presser 50. The other ends of the tension springs 52a, 52b extend toward the solenoid 48 and are attached to the attachment plate 46. Therefore, the presser 50 is normally urged in the direction of the arrow B under the resiliency of the tension springs 52a, 52b.

A third roller pair 54 is disposed below the guide plates 40a, 40b. The third roller pair 54 comprises two rollers 54a, 54b, and the roller 54b is coaxially coupled to a sprocket 56 around which a chain 58 is trained. The chain 58 is also trained around a sprocket 62 coaxially connected to a drive shaft 60a of a rotative drive source 60. The roller 54a of the third roller pair 54 is rotatable selectively in the directions of the arrows C, D by the rotative drive source 60.

As shown in FIG. 1, auxiliary scanning feed means 64 is located leftwardly and downwardly of the third roller pair 54. The feed means 64 includes two rollers pairs 66, 68 spaced from each other. The roller pair 66 includes two rollers 66a, 66b, the roller 66a being coaxially coupled to a drive shaft (not shown) of a rotative drive source 70. The roller pair 68 includes two rollers 68a, 68b. The roller 66a is operatively coupled to the roller 68a through transmission means such as a belt. The rollers 66b, 68b are held in rolling contact with the respective rollers 66a, 66b. An optical system 72 is disposed above the auxiliary scanning means 64 for applying a laser beam between the roller pairs 66, 68.

Two curved guide members 74a, 74b are disposed between the roller pair 68 and the third roller pair 54. Another guide member 76 which is curved vertically upwardly is disposed near the roller pair 66.

A fourth roller pair 78 is positioned at the upper end of the guide member 76, and a fifth roller pair 80 is located above the fourth roller pair 78. The fourth roller pair 78 is situated below a rotative drive source 82 having a drive shaft (not shown) coaxially connected to a sprocket 84. A chain 86 is trained around the sprocket 84 and other sprockets (not shown) coaxially coupled to respective rollers of the fourth and fifth roller pairs 78, 80. A pair of guide members 90a, 90b is disposed between the fourth and fifth roller pairs 78, 80, and another pair of guide members 92a, 92b is disposed between the fifth roller pair 80 and a film outlet 88 of the image recorder 10. The film outlet 88 is held in communication with the interior of the automatic image developing unit 12 which develops and fixes an image on a recorded film F supplied from the film outlet 88.

The image recorder for carrying out a method of feeding an image recording carrier according to the present invention is constructed as described above. Operation and advantages of the image recorder will be described below.

The film magazine 20 storing a stack of films F is loaded into the magazine support base 18, which is then inserted into the image recorder 10.

Then, as shown in FIG. 1, the film access opening 22 of the film magazine 20 is opened into the chamber 16, and suction cup 24 is displaced by the drive source 26 as indicated by the broken lines to pick up one film F, at a time, from the film magazine 20 and position the film F so as to be gripped by the first roller pair 28. The sprocket 34 is rotated by the rotative drive source 32 to cause the chain 30 to rotate the first roller pair 28 in the directions of the arrows. The film F gripped by the first roller pair 28 is now fed along the guide members 38a, 38b to the second roller pair 36. The second roller pair 36 is also rotated in the directions of the arrows by the rotative drive source 32 through the chain 30. The film F is gripped and fed by the second roller pair 36 vertically downwardly. When the film F leaves the second roller pair 36, the film F falls by gravity and is guided by the guide members 40a, 40b toward the third roller pair 54. At this time, the film F may hit the positioning member 44 located near the lower end of the guide members 40a, 40b. However, the upper slanted surface 44a of the positioning member 44 laterally displaces and smoothly guides the film F to a position between the positioning member 44 and the presser 50.

Figure 3A:
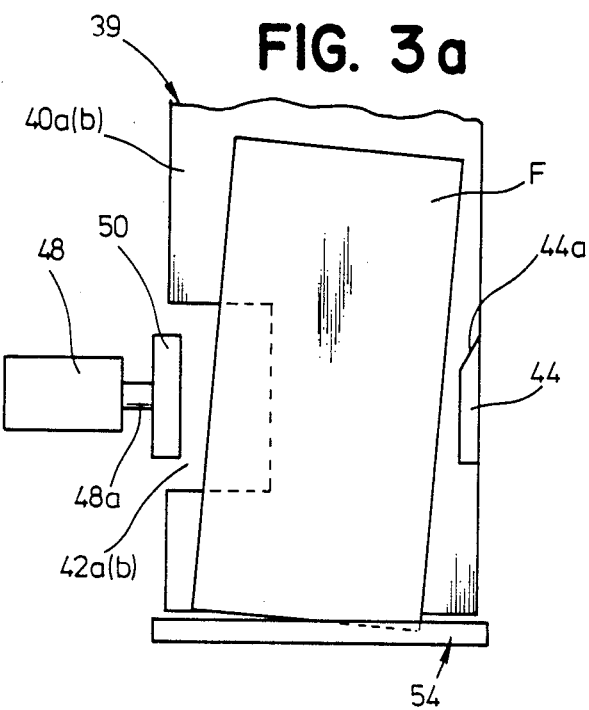
FIGS. 3(a) and 3(b) are fragmentary views showing operation of the feed device illustrated in FIG. 2.
Figure 3B:
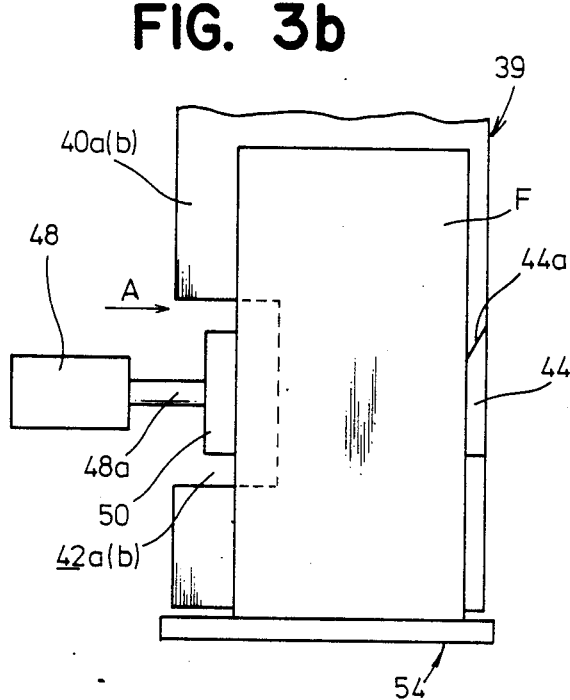

While the film F is being fed from the second roller pair 36 toward the third roller pair 54 along and between the guide members 40a, 40b, the film F may be positionally displaced or skewed in the transverse direction thereof. At this time, as shown in FIG. 3(a), the leading end of the film F as it is skewed is partly gripped between the rollers 54a, 54b of the third roller pair 54. Then, the rotative driver source 60 is actuated to cause the chain 58 to rotate the roller 54a of the third roller pair 54 in the direction of the arrow C. The film F gripped by the third roller pair 54 is thus slightly backed off upwardly and placed endwise on the third roller pair 54 (see FIGF. 3(b)), so that a position to start to record an image on the film F can stably be established in the auxiliary scanning direction. At the same time, the solenoid 48 is energized to enable the rod 48a to displace the presser 50 in the direction of the arrow A. The presser 50 enters the recesses 42a, 42b defined in the guide members 40a, 40b and presses a side of the film F in the direction of the arrow A. Since the positioning member 44 is located on the opposite side of the film F, the film F is positioned by and between the presser 50 and the positioning member 44, as shown in FIG. 3(b). The pressing force applied to the presser 50 in the direction of the arrow A by the solenoid 48 is controlled by the tension springs 52a, 52b by which the presser 50 is normally urged in the direction of the arrow B, so that the presser 50 can smoothly abut against the film F without abrupt shocks.

After the film F has been positioned in the above manner, the roller 54a of the third roller pair 54 is rotated in the direction of the arrow D by the rotative drive source 60 through the sprocket 62, the chain 58, and the sprocket 56. The film F is now delivered from the third roller pair 54 via the guide members 74a, 74b toward the auxiliary scanning feed means 64.

In the illustrated embodiment, the film F is positioned between the guide members 40a, 40b by being pressed against the positioning member 44 by the presser 50 while the roller 54a is being rotated in the direction of the arrow C. However, the roller 54a may be stopped after it has been rotated in the direction of the arrow C, and thereafter the film F may be pressed in the direction of the arrow A by the presser 50 for positioning the film F in place.

The film F as it is fed in an auxiliary scanning direction is then gripped by the roller pairs 66, 68. By energizing the rotative drive source 70 to rotate the roller 66a in the direction of the arrow, the roller 68 is also rotated in the direction of the arrow through the transmission means. The film F is fed in the direction of the arrow E (auxiliary scanning direction) by being gripped first by the roller pair 68 and then by the roller pair 66. At the same time, a laser beam source (not shown) in the optical system 72 is energized. A laser beam 72a emitted from the laser beam source is applied to the film F gripped between the roller pairs 66, 68 in a main scanning direction substantially normal to the auxiliary scanning direction, for thereby recording a desired image on the film F.

Since the film F has been accurately positioned with respect to the auxiliary scanning direction, as described above, the image can desirably be recorded on the film F. After the film F has been fed in the auxiliary scanning direction by the roller pairs 66, 68, the film F is directed upwardly by the guide member 76.

The rotative drive source 82 is actuated to cause the sprocket 84 and the chain 86 to rotate the fourth roller pair 78, which grips the film F and feeds the same along and between the guide members 90a, 90b toward the fifth roller pair 80. Then, the film F is delivered by the fifth roller pair 80 to travel between the guide members 92a, 92b which direct the film F horizontally through the film outlet 88 into the automatic image developing unit 12.

In the automatic image developing unit 12, the image recorded on the film F is developed and fixed, and the film F is washed and dried. The film F thus processed will be used as a film plate for various applications.

With the present invention, as described above, when one, at a time, of stacked image recording carriers is picked up by the delivery mechanism and scanned for image recording, the image recording carrier as it is gripped by a roller pair on its way to the auxiliary scanning feed means is backed off to establish a stable position for starting to record an image on the image recording carrier, and is also pressed laterally toward the positioning member so that the image recording carrier is transversely positioned.

Therefore, the image recording carrier to be fed to the scanning unit where the image recording carrier is scanned is accurately positioned at all times. As a result, the image recording carrier can accurately be scanned for image recording or reading operation.

The present invention has been described as being applied in a system for recording an image on an image recording carrier. However, the principles of the present invention are also applicable to a system for reading an image recorded on an image recording carrier.

Although a certain preferred embodiment has been shown and described, it should be understood that many changes and modifications may be made therein without departing from the scope of the appended claims.

What is claimed is:

1. A method of feeding an image recording carrier to a scanning unit for recording an image on or reading an image from the image recording carrier, said method comprising the steps of: delivering the image recording carrier via first feed means to second feed means disposed therebelow and comprising a roller pair; moving said image recording carrier which has been fed to and gripped by said second feed means back toward said first feed means by actuating said second feed means in one direction; positioning said image recording carrier moved back toward said first feed means; and actuating said second feed means in the opposite direction to deliver said image recording carrier toward the scanning unit.

2. A method according to claim 1, wherein said image recording carrier is positioned by pressing said image recording carrier transversely after said second feed means has been actuated in said one direction to move back said image recording carrier.

3. A method according to claim 1, wherein said image recording carrier is positioned by pressing said image recording carrier transversely at the same time that said second feed means is actuated in said one direction to move back said image recording carrier.

4. An apparatus for feeding an image recording carrier to a scanning unit for recording an image on or reading an image from the image recording carrier, said apparatus comprising: a guide member for guiding said image recording carrier as it falls by gravity from an image recording carrier storage unit toward the scanning unit; pressing means disposed on one side of said guide member for pressing said image recording carrier transversely; positioning means disposed on an opposite side of said guide member for receiving and positioning said image recording carrier which is pressed by said pressing means; and a reversibly rotatable roller pair disposed at a terminal end of said guide member.

5. An apparatus according to claim 4, wherein said pressing means comprises a linear solenoid.

6. An apparatus according to claim 5, wherein said linear solenoid has a rod, said pressing means further including a dampening member coupled to a distal end of said rod for dampening pressing movement of said rod.

7. An apparatus according to claim 6, wherein said dampening member comprises a tension spring for returning said rod to its original position.

8. An apparatus according to any one of claims 4 through 7, wherein said guide member has a recess defined therein for receiving a presser of said pressing means.

9. An apparatus according to any one of claims 4 through 7, wherein said positioning means comprises a positioning member mounted on said guide member, said positioning member having a slanted surface on an end thereof for guiding said image recording carrier as it falls by gravity into a position between said positioning means and said pressing means.

* * * * *